(12) United States Patent
Vallabhaneni et al.

(10) Patent No.: US 12,081,630 B2
(45) Date of Patent: Sep. 3, 2024

(54) GENERATING AND PROVIDING ENHANCED USER INTERFACES BY IMPLEMENTING DATA, AI, INTENTS AND PERSONALIZATION (DAIP) TECHNOLOGY

(71) Applicant: Bank of America Corporation, Charlotte, NC (US)

(72) Inventors: Prashanth Vallabhaneni, Chadds Ford, PA (US); Diane S. Cannato, Palm City, FL (US); Rosheny Edathil, Little Elm, TX (US); Satyabrata Pradhan, Hyderabad (IN); Sridhar Viswanathan, Hyderabad (IN); Ashwin Kumar Yedte, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 225 days.

(21) Appl. No.: 17/540,961

(22) Filed: Dec. 2, 2021

(65) Prior Publication Data

US 2023/0179672 A1    Jun. 8, 2023

(51) Int. Cl.
*H04L 67/50*      (2022.01)
*G06N 20/00*      (2019.01)
(Continued)

(52) U.S. Cl.
CPC .......... *H04L 67/535* (2022.05); *G06N 20/00* (2019.01); *G07F 19/206* (2013.01);
(Continued)

(58) Field of Classification Search
None
See application file for complete search history.

(56) References Cited

U.S. PATENT DOCUMENTS

| 10,706,450 B1 | 7/2020 | Tavernier | |
|---|---|---|---|
| 2008/0120240 A1* | 5/2008 | Ginter | H04L 63/16 705/51 |

(Continued)

FOREIGN PATENT DOCUMENTS

JP      6813615 B2      1/2021

OTHER PUBLICATIONS

Scheit et al., "Automated Event Driven Dynamic Case Management", Sep. 1, 2016, IEEE, 2016 IEEE 20th International Enterprise Distributed Object Computing Workshop (EDOCW) (pp. 1-10) (Year: 2016).*

*Primary Examiner* — Davoud A Zand
(74) *Attorney, Agent, or Firm* — Banner & Witcoff, Ltd.

(57) ABSTRACT

Aspects of the disclosure relate to generating and providing enhanced user interfaces by implementing data, AI, intents and personalization (DAIP) technology. In some embodiments, a computing platform may receive, from enterprise computing infrastructure, first unstructured activity data associated with a first enterprise channel. Subsequently, the computing platform may identify one or more user intents by applying an intent discovery model to the first unstructured activity data associated with the first enterprise channel. Then, the computing platform may generate status tracking information based on identifying the one or more user intents. Thereafter, the computing platform may store, in a consolidated event repository, the status tracking information generated based on identifying the one or more user intents, and storing the status tracking information in the consolidated event repository may cause the status tracking information to be exposed to multiple computer systems associated with different enterprise channels.

20 Claims, 9 Drawing Sheets

(51) Int. Cl.
  *G07F 19/00* (2006.01)
  *H04L 67/306* (2022.01)
  *H04L 67/55* (2022.01)
  *H04M 3/493* (2006.01)

(52) U.S. Cl.
  CPC ............ *H04L 67/306* (2013.01); *H04L 67/55* (2022.05); *H04M 3/493* (2013.01)

(56) References Cited

U.S. PATENT DOCUMENTS

| | | | |
|---|---|---|---|
| 2010/0317420 A1* | 12/2010 | Hoffberg | G06Q 30/0282 463/1 |
| 2015/0278764 A1* | 10/2015 | Patil | G06F 16/93 705/301 |
| 2016/0255139 A1* | 9/2016 | Rathod | H04N 1/32101 709/203 |
| 2021/0224817 A1 | 7/2021 | Prendki | |
| 2021/0374058 A1 | 12/2021 | Chandrasekaran et al. | |
| 2021/0374121 A1 | 12/2021 | Paul et al. | |
| 2021/0374141 A1 | 12/2021 | Zhao et al. | |
| 2021/0374162 A1 | 12/2021 | Kirdey et al. | |
| 2021/0374172 A1 | 12/2021 | Jensen et al. | |
| 2021/0374250 A1 | 12/2021 | Inagaki et al. | |
| 2021/0374295 A1 | 12/2021 | Beck et al. | |
| 2021/0374299 A1 | 12/2021 | Duff et al. | |
| 2021/0374357 A1 | 12/2021 | Holmdahl et al. | |
| 2021/0374361 A1 | 12/2021 | Wick et al. | |
| 2021/0374456 A1 | 12/2021 | Umakanth et al. | |
| 2021/0374551 A1 | 12/2021 | Vijil et al. | |
| 2021/0374670 A1 | 12/2021 | Barbush et al. | |
| 2021/0374749 A1 | 12/2021 | Vukich et al. | |
| 2021/0374803 A1 | 12/2021 | Tavassoli | |
| 2021/0374857 A1 | 12/2021 | Pierce et al. | |
| 2021/0375035 A1 | 12/2021 | Smith et al. | |
| 2021/0375262 A1 | 12/2021 | Wick et al. | |
| 2021/0375415 A1 | 12/2021 | Farrell | |
| 2021/0375439 A1 | 12/2021 | Mckinnon et al. | |
| 2021/0375468 A1 | 12/2021 | Zhang et al. | |
| 2021/0377002 A1 | 12/2021 | Guillama et al. | |
| 2021/0377012 A1 | 12/2021 | Bernat et al. | |
| 2021/0377166 A1 | 12/2021 | Brar et al. | |
| 2021/0377206 A1 | 12/2021 | Nizar et al. | |
| 2021/0377231 A1 | 12/2021 | Soon-Shiong et al. | |
| 2021/0377254 A1 | 12/2021 | Avetisov et al. | |
| 2021/0377392 A1 | 12/2021 | Traba et al. | |
| 2021/0377583 A1 | 12/2021 | Liu et al. | |
| 2021/0377960 A1 | 12/2021 | Carl et al. | |
| 2022/0414492 A1* | 12/2022 | Jezewski | G06Q 10/0633 |

* cited by examiner

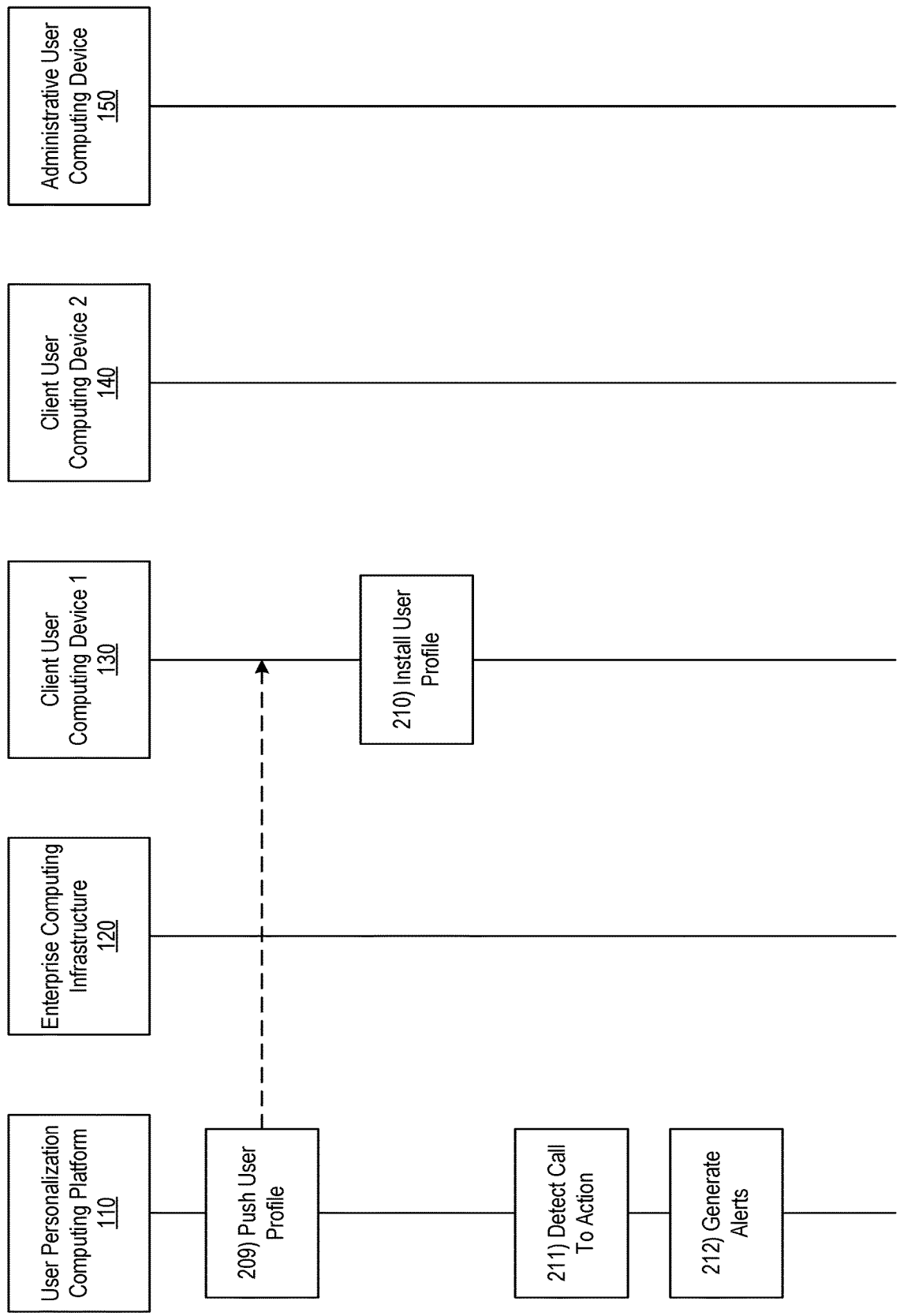

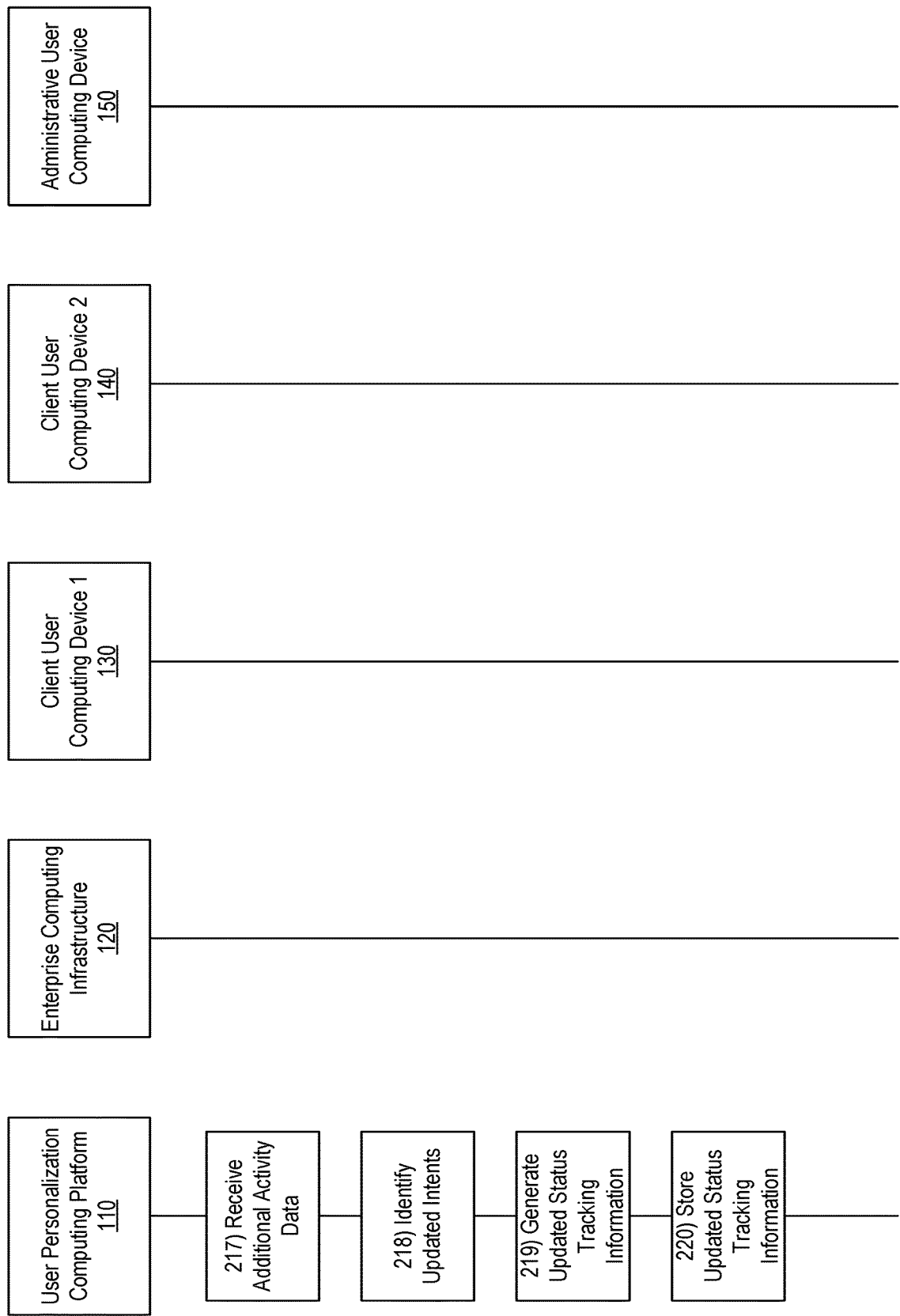

GENERATING AND PROVIDING ENHANCED USER INTERFACES BY IMPLEMENTING DATA, AI, INTENTS AND PERSONALIZATION (DAIP) TECHNOLOGY

BACKGROUND

Aspects of the disclosure relate to deploying digital data processing systems, managing enterprise data and resources, and providing automated assistance to users of enterprise systems. In particular, one or more aspects of the disclosure relate to generating and providing enhanced user interfaces by implementing data, AI, intents and personalization (DAIP) technology.

Enterprise organizations may deploy various systems and interfaces to serve customers and other users. For example, financial institutions may deploy and operate different systems that provide different services across different enterprise channels. In some instances, a user of a particular service on a particular channel might have a specific need that is related to activity which they have performed on another channel. In some instances, however, it may be difficult to provide relevant assistance to such a user due to enterprise configurations having different computer systems and resources serving and/or supporting applications on different enterprise channels.

SUMMARY

Aspects of the disclosure provide effective, efficient, scalable, and convenient technical solutions that address and overcome the technical problems associated with assisting users of enterprise systems by generating and providing enhanced user interfaces by implementing data, AI, intents and personalization (DAIP) technology.

In accordance with one or more embodiments, a computing platform having at least one processor, a communication interface, and memory may receive, via the communication interface, from enterprise computing infrastructure, first unstructured activity data associated with a first enterprise channel. Subsequently, the computing platform may identify one or more user intents by applying an intent discovery model to the first unstructured activity data associated with the first enterprise channel. Then, the computing platform may generate status tracking information based on identifying the one or more user intents. Thereafter, the computing platform may store, in a consolidated event repository, the status tracking information generated based on identifying the one or more user intents, and storing the status tracking information in the consolidated event repository may cause the status tracking information to be exposed to multiple computer systems associated with different enterprise channels.

In some embodiments, receiving the first unstructured activity data associated with the first enterprise channel may include receiving one or more of a client identifier associated with a first activity event, a user name associated with the first activity event, a timestamp associated with the first activity event, a channel identifier associated with the first activity event, one or more keywords associated with the first activity event, or a problem type identifier associated with the first activity event.

In some embodiments, receiving the first unstructured activity data associated with the first enterprise channel may include receiving unstructured activity data that is captured by a source system without a native intent mapping functionality.

In some embodiments, receiving the first unstructured activity data associated with the first enterprise channel may include receiving unstructured activity data that is captured on a voice assistant channel, an interactive voice response (IVR) channel, an automated teller machine (ATM) channel, an online banking channel, a mobile banking channel, or an in-person banking channel.

In some embodiments, identifying the one or more user intents by applying the intent discovery model to the first unstructured activity data associated with the first enterprise channel may include applying a machine learning model that is continuously applied to different intent data associated with different users that is received across different channels.

In some embodiments, identifying the one or more user intents by applying the intent discovery model to the first unstructured activity data associated with the first enterprise channel may include applying a machine learning model that is trained on a baseline dataset that maps specific sequences of customer activity events to specific customer intents.

In some embodiments, generating the status tracking information based on identifying the one or more user intents may include generating a status tracking data structure that includes one or more of an intent identifier, an intent type identifier, a completion status identifier, a progress status value, or a number of interactions value.

In some embodiments, storing the status tracking information in the consolidated event repository may include storing the status tracking information in a database that comprises one or more call to action templates.

In some embodiments, after storing the status tracking information in the consolidated event repository, the computing platform may generate, based on the status tracking information, a user profile for a user device linked to the first unstructured activity data associated with the first enterprise channel. Subsequently, the computing platform may push the user profile to the user device, and pushing the user profile to the user device may cause the user device to install the profile.

In some embodiments, pushing the user profile to the user device may cause a local application on the user device to present one or more offline reminder messages.

In some embodiments, pushing the user profile to the user device may cause a local application on the user device to optimize call routing for a user linked to the user device.

In some embodiments, the computing platform may detect that a call to action condition is met based on the status tracking information stored in the consolidated event repository. In response to detecting that the call to action condition is met based on the status tracking information stored in the consolidated event repository, the computing platform may generate one or more alerts for one or more user devices. Subsequently, the computing platform may send, via the communication interface, to the one or more user devices, the one or more alerts generated for one or more user devices.

In some embodiments, detecting that the call to action condition is met based on the status tracking information stored in the consolidated event repository may include detecting that an additional customer interaction has occurred, and generating the one or more alerts for the one or more user devices may include generating one or more personalized offer messages, insight messages, or proactive communication messages based on the status tracking information stored in the consolidated event repository.

In some embodiments, the computing platform may receive, via the communication interface, from the enterprise computing infrastructure, second unstructured activity data associated with a second enterprise channel different from the first enterprise channel. Subsequently, the computing platform may identify one or more updated user intents by applying the intent discovery model to the second unstructured activity data associated with the second enterprise channel. Then, the computing platform may generate updated status tracking information based on identifying the one or more updated user intents. Thereafter, the computing platform may store, in the consolidated event repository, the updated status tracking information generated based on identifying the one or more updated user intents, and storing the updated status tracking information in the consolidated event repository may cause the updated status tracking information to be exposed to the multiple computer systems associated with the different enterprise channels.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for generating and providing enhanced user interfaces by implementing data, AI, intents and personalization (DAIP) technology in accordance with one or more example embodiments;

DETAILED DESCRIPTION

Figure 1A:
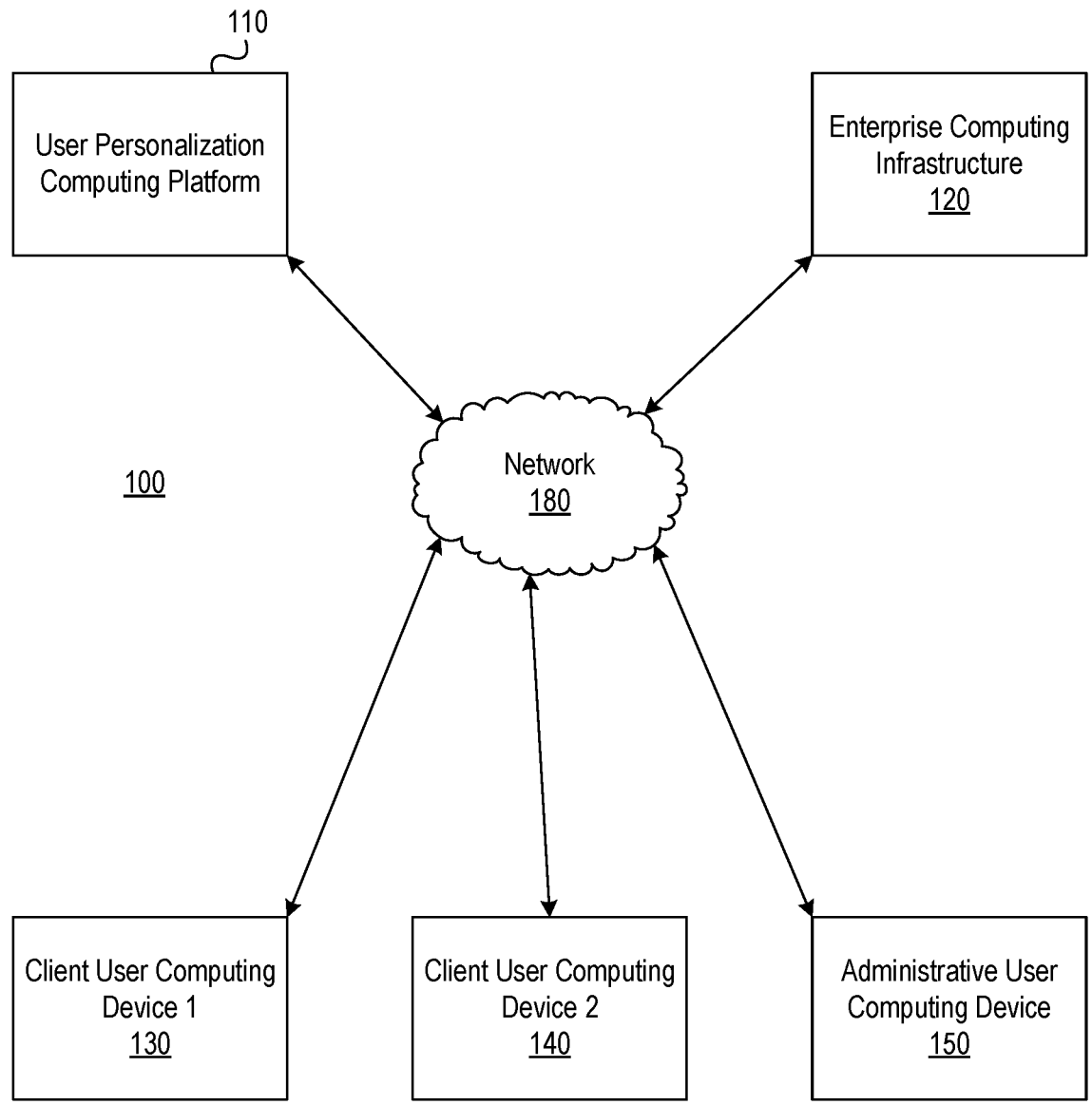
FIGS. 1A and 1B depict an illustrative computing environment for generating and providing enhanced user interfaces by implementing data, AI, intents and personalization (DAIP) technology in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

One or more aspects of the disclosure address questions such as: How do we safely use information gathered via one channel on another channel to more effectively serve customer needs? How can we combine information across channels to derive a customer intent? How can we better understand a customer's reasons for connecting with the enterprise organization in a given instance? And when a customer returns to certain channels, how can we personalize what we present to that customer using the information that we have? An overall goal is to improve customer experience and provide customers with true omni-channel experience.

In developing a solution that aligns with this goal, three considerations may be relevant. First, an understanding of what information is being gathered may be relevant to the solution. Second, an understanding of how that information is being combined to derive customer intent may be relevant to the solution. And third, an understanding of what is being done once the customer intent has been derived may be relevant to the solution. Each of these considerations is explored in further detail below.

Regarding what information is being gathered, information that is used in a DAIP analysis may be received from various sources and systems. For example, various types of information may be gathered with respect to different customers across different channels, and any and/or all of this information may be used in deriving a specific intent for a specific customer and subsequently personalizing content (e.g., offers, resources, contacts, or the like) for the specific customer. In some instances, gathered information may be received from a chat bot, such as an ERICA chat bot. This information may, for instance, identify a specific customer request, such as "I'd like to see my spending history or bank statement." Additionally or alternatively, other tools that convert text to speech and then into intent information may be employed. In some instances, these text-to-speech, intent-derivation tools might exist for some channels (e.g., mobile banking) but not others (e.g., telephone banking).

By applying one or more aspects of the disclosure, information about a customer's interactions in one channel may be collected, analyzed, and used to personalize content presented to the customer in another channel or in the same channel at a later date/time. The analysis of this information may be performed using artificial intelligence (AI) and/or trained machine learning models which may classify different customer actions as corresponding to different customer intents. In this way, a discrete set of customer actions may be mapped to a greater intent of the customer (e.g., the customer may request pages about different investment tools, and this may correspond to an intent that the customer is seeking help with investment guidance). The AI and/or trained machine learning models may be particularly suited to this application because such AI and/or trained machine learning models may run on top of unstructured data so as to derive and/or otherwise discover a customer intent.

Once the customer intent is discovered, intent information that identifies the discovered intent may be stored in a database. In addition, on a concurrent or substantially concurrent basis, different classification algorithms may be applied to the intents that are discovered for one or more customers. For instance, different customer intents may be grouped and/or categorized (e.g., into a servicing category, a marketing category, or the like). In addition, status tracking information may be created and/or updated for each intent, so as to allow the status of each different customer intent to be monitored throughout its lifecycle.

With regard to status tracking, a particular intent may be created in a certain channel (e.g., mobile), as illustrated above. Once the intent is created, the journey of that intent may be tracked across different channels (e.g., mobile, telephone, in-person, or the like). Information identifying the intent and the journey of the intent may be stored in a database, for instance, as an intent identifier and corresponding intent journey information. Template information also may be stored in the database. Such template information may, for instance, define different calls to action for different intents. These calls to actions might trigger different actions that might be taken on a given intent.

The database where intent information store may be exposed to all channels. This exposure may enable the intent tracking and personalization to be provided across all channels of the organization. By implementing this technical configuration on the repository side, a true omni-channel experience may be provided by the computer systems implementing one or more aspects of the disclosure.

After an intent is discovered, and as and when a customer continues to do certain actions, the computer systems implementing one or more aspects of the disclosure may generate and/or provide the customer with personalized information associated with their discovered intents. For instance, maybe the customer is interested in a home loan but they have not yet submitted an application. Or maybe the customer has made a large deposit and is maintaining a checking or savings account at a relatively high balance, and thus the customer might want to connect with an investment advisor for help with managing that money. In this example, there may be a call to action to connect the customer with an investment advisor. These intents may be discovered and the calls to action may be triggered automatically by the computer systems implementing one or more aspects of the disclosure.

As a customer moves through an intent journey, the computer systems implementing one or more aspects of the disclosure may continue to track how the customer's intents are being serviced. If a given intent is fulfilled (e.g., a home loan application is submitted), the computer systems implementing one or more aspects of the disclosure may move onto the next intent and begin presenting personalized content associated with that intent.

As discussed above, an intents repository may be developed and deployed, and the intents repository may be exposed to various other systems across the enterprise to support personalization. For example, the repository might need to be exposed to computer systems associated with all channels of the enterprise organization. By exposing the repository in this way, all channels and their corresponding systems may use intent information and/or present personalized offers based on an individual customer's intent fulfillment journey.

Figure 1B:
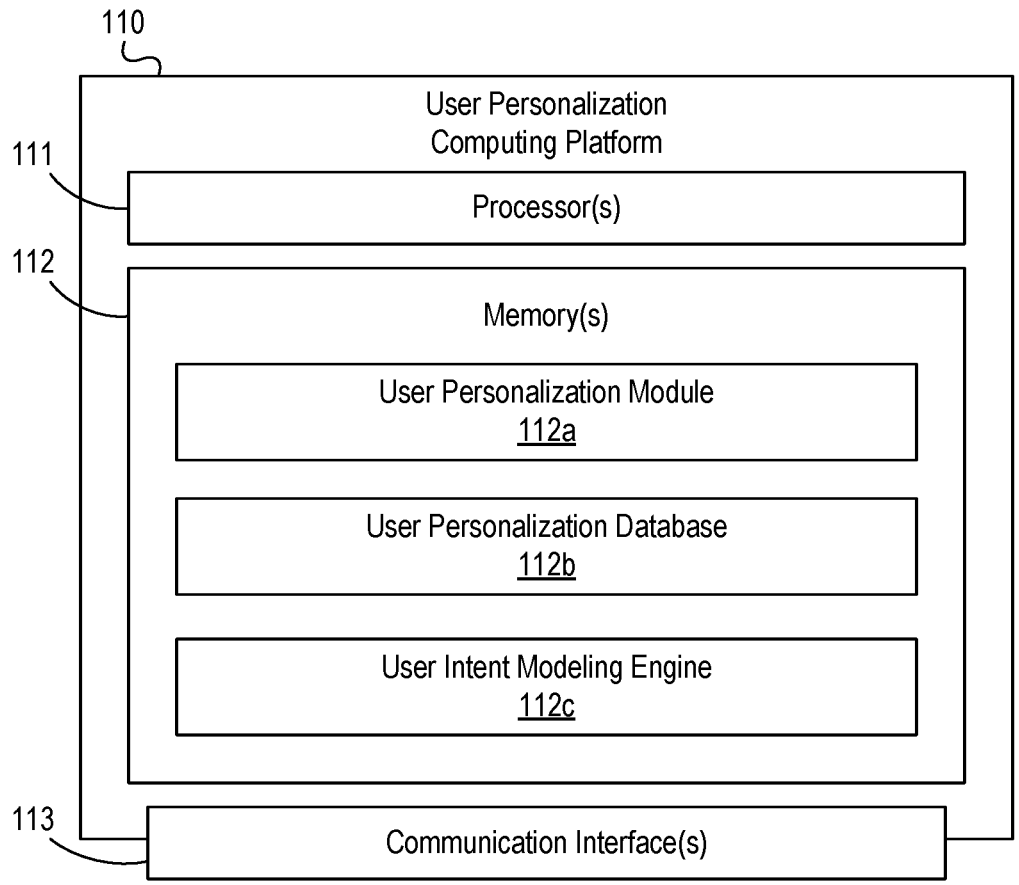

FIGS. 1A and 1B depict an illustrative computing environment for generating and providing enhanced user interfaces by implementing data, AI, intents and personalization (DAIP) technology in accordance with one or more example embodiments. Referring to FIG. 1A, computing environment 100 may include one or more computer systems. For example, computing environment 100 may include a user personalization computing platform 110, enterprise computing infrastructure 120, a first client user computing device 130, a second client user computing device 140, and an administrative user computing device 150.

As illustrated in greater detail below, user personalization computing platform 110 may include one or more computing devices configured to perform one or more of the functions described herein. For example, user personalization computing platform 110 may include one or more computers (e.g., laptop computers, desktop computers, servers, server blades, or the like).

Enterprise computing infrastructure 120 may include one or more computing devices and/or other computer components (e.g., processors, memories, communication interfaces). In addition, and as illustrated in greater detail below, enterprise computing infrastructure 120 may be configured to provide various enterprise and/or back-office computing functions for an organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute transactions on specific accounts based on commands and/or other information received from other computer systems included in computing environment 100. Additionally or alternatively, enterprise computing infrastructure 120 may include various servers and/or databases that host and/or otherwise provide an online banking portal and/or one or more other websites, various servers and/or databases that host and/or otherwise provide a mobile banking portal and/or one or more other mobile applications, one or more interactive voice response (IVR) systems, and/or other systems.

Client user computing device 130 may be a desktop computing device (e.g., personal computer) or mobile computing device (e.g., smartphone, tablet, smart watch, laptop computer, or the like). In addition, client user computing device 130 may be linked to and/or used by a first user (who may, e.g., be a customer of an enterprise organization operating user personalization computing platform 110 and/or enterprise computing infrastructure 120). Client user computing device 140 also may be a desktop computing device (e.g., personal computer) or mobile computing device (e.g., smartphone, tablet, smart watch, laptop computer, or the like). In addition, client user computing device 140 may be linked to and/or used by a second user (who may, e.g., be a customer of an enterprise organization operating user personalization computing platform 110 and/or enterprise computing infrastructure 120) different from the first user linked to client user computing device 130.

Administrative user computing device 150 may be a desktop computing device (e.g., personal computer) or mobile computing device (e.g., smartphone, tablet, smart watch, laptop computer, or the like). In addition, administrative user computing device 150 may be linked to and/or used by an administrative user (who may, e.g., be an employee of an enterprise organization operating user personalization computing platform 110 and/or enterprise computing infrastructure 120).

Computing environment 100 also may include one or more networks, which may interconnect one or more of user personalization computing platform 110, enterprise computing infrastructure 120, client user computing device 130, client user computing device 140, and administrative user computing device 150. For example, computing environment 100 may include a network 180 (which may, e.g., interconnect user personalization computing platform 110, enterprise computing infrastructure 120, client user computing device 130, client user computing device 140, administrative user computing device 150, and/or one or more other systems which may be associated with an enterprise organization, such as a financial institution, with one or more other systems, public networks, sub-networks, and/or the like).

In one or more arrangements, user personalization computing platform 110, enterprise computing infrastructure 120, client user computing device 130, client user computing device 140, and administrative user computing device 150 may be any type of computing device capable of receiving a user interface, receiving input via the user interface, and communicating the received input to one or more other computing devices. For example, user personalization computing platform 110, enterprise computing infrastructure 120, client user computing device 130, client user computing device 140, administrative user computing device 150, and/or the other systems included in computing environment 100 may, in some instances, include one or more processors, memories, communication interfaces, storage devices, and/or other components. As noted above, and as illustrated in greater detail below, any and/or all of user personalization computing platform 110, enterprise computing infrastructure 120, client user computing device 130, client user computing device 140, and administrative user computing device 150 may, in some instances, be special-purpose computing devices configured to perform specific functions.

Referring to FIG. 1B, user personalization computing platform 110 may include one or more processor(s) 111, memory(s) 112, and communication interface(s) 113. A data bus may interconnect processor 111, memory 112, and communication interface 113. Communication interface 113 may be a network interface configured to support communication between user personalization computing platform 110 and one or more networks (e.g., network 180 or the like). Memory 112 may include one or more program modules having instructions that when executed by processor 111 cause user personalization computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of user personalization computing platform 110 and/or by different computing devices that may form and/or otherwise make up user personalization computing platform 110. For example, memory 112 may have, store, and/or include a user personalization module 112a, a user personalization database 112b, and user intent modeling engine 112c. User personalization module 112a may have instructions that direct and/or cause user personalization computing platform 110 to generate and provide enhanced user interfaces by implementing data, AI, intents and personalization (DAIP) technology, as discussed in greater detail below. User personalization database 112b may store information used by user assistance module 112a and/or user personalization computing platform 110 in generating and providing enhanced user interfaces by implementing data, AI, intents and personalization (DAIP) technology. User intent modeling engine 112c may have instructions that direct and/or cause user personalization computing platform 110 to generate, train, store, use, and/or update one or more machine learning models in generating and providing enhanced user interfaces by implementing data, AI, intents and personalization (DAIP) technology.

Figure 2A:
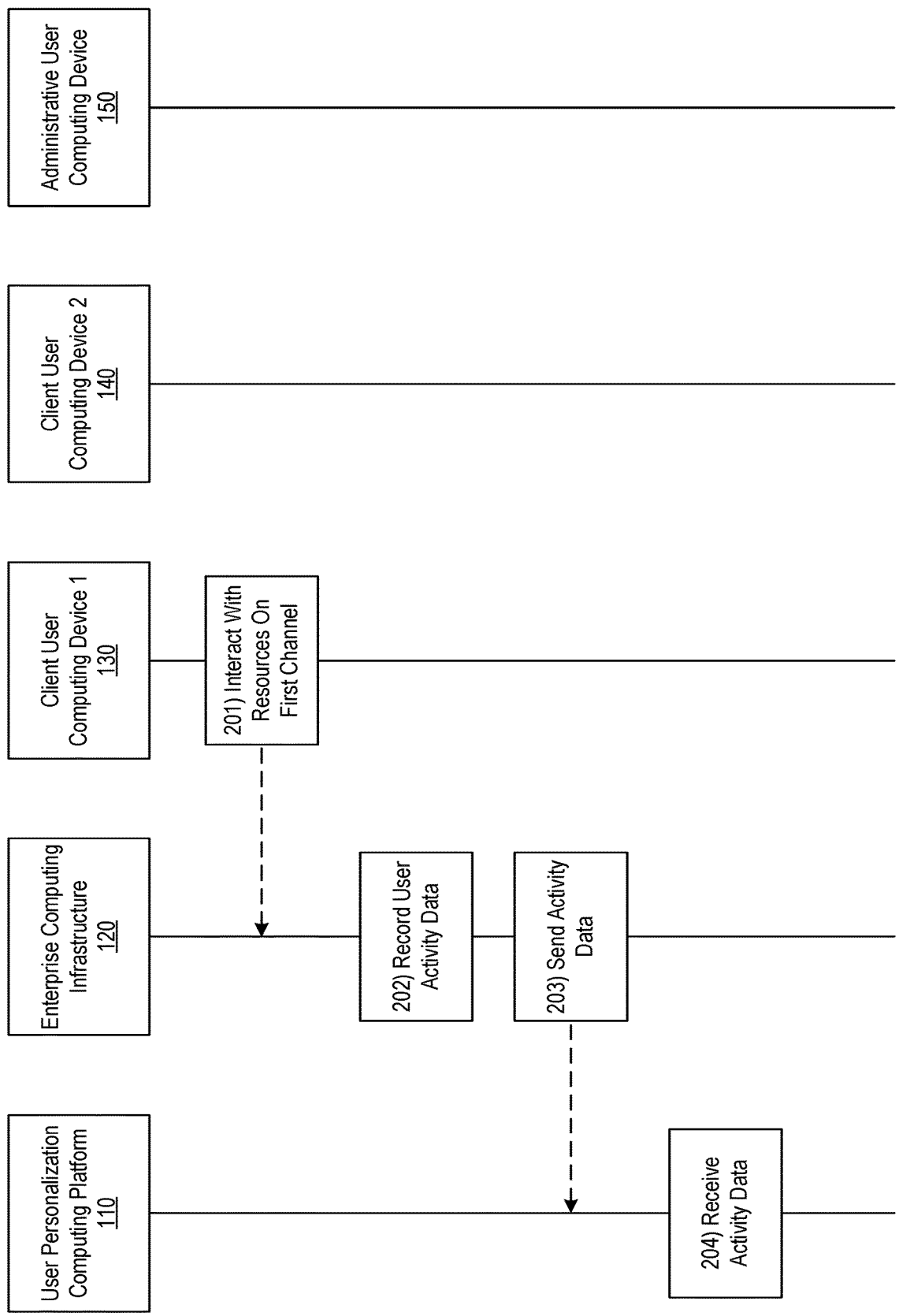

FIGS. 2A-2E depict an illustrative event sequence for generating and providing enhanced user interfaces by implementing data, AI, intents and personalization (DAIP) technology in accordance with one or more example embodiments. Referring to FIG. 2A, at step 201, client user computing device 130 may interact with resources on a first channel. For example, client user computing device 130 may access, modify, and/or otherwise interact with one or more computing resources that are provided on a first enterprise channel and/or hosted by one or more computer systems that are connected to and/or part of enterprise computing infrastructure 120. For instance, client user computing device 130 may interact with a natural language application that includes a chat bot and is provided on a chat bot channel or a mobile banking application that is provided on a mobile banking channel.

At step 202, enterprise computing infrastructure 120 may record user activity data. For example, at step 202, enterprise computing infrastructure 120 may generate and/or store unstructured user activity data that specifies one or more characteristics of (and/or is otherwise associated with) the interactions of the user of client user computing device 130 with the resources of the first channel. At step 203, enterprise computing infrastructure 120 may send the user activity data to user personalization computing platform 110.

At step 204, user personalization computing platform 110 may receive activity data from enterprise computing infrastructure 120. For example, at step 204, user personalization computing platform 110 may receive, via the communication interface (e.g., communication interface 113), from enterprise computing infrastructure (e.g., enterprise computing infrastructure 120), first unstructured activity data associated with a first enterprise channel. The unstructured activity data may, for instance, be one or more data files in various different formats, and might not be particularly adapted for a specific application on user personalization computing platform 110. Rather, the unstructured activity data might include raw event logs, activity logs, interaction data, or the like in a variety of different file formats that are native to the corresponding source system(s) that produced unstructured activity data.

In some embodiments, receiving the first unstructured activity data associated with the first enterprise channel may include receiving one or more of a client identifier associated with a first activity event, a user name associated with the first activity event, a timestamp associated with the first activity event, a channel identifier associated with the first activity event, one or more keywords associated with the first activity event, or a problem type identifier associated with the first activity event. For example, in receiving the first unstructured activity data associated with the first enterprise channel at step 204, user personalization computing platform 110 may receive one or more of a client identifier associated with a first activity event, a user name associated with the first activity event, a timestamp associated with the first activity event, a channel identifier associated with the first activity event, one or more keywords associated with the first activity event, or a problem type identifier associated with the first activity event. Any and/or all of this information may have been captured by enterprise computing infrastructure 120 during and/or based on the interactions of user personalization computing platform 110 with the first enterprise channel at step 201.

In some embodiments, receiving the first unstructured activity data associated with the first enterprise channel may include receiving unstructured activity data that is captured by a source system without a native intent mapping functionality. For example, in receiving the first unstructured activity data associated with the first enterprise channel at step 204, user personalization computing platform 110 may receive unstructured activity data that is captured by a source system without a native intent mapping functionality. For instance, the unstructured activity data may have been captured by an interactive voice response (IVR) channel system or an automated teller machine (ATM) channel system or another source system that does not have or otherwise provide its own native intent mapping functionality.

In some embodiments, receiving the first unstructured activity data associated with the first enterprise channel may include receiving unstructured activity data that is captured on a voice assistant channel, an interactive voice response (IVR) channel, an automated teller machine (ATM) channel, an online banking channel, a mobile banking channel, or an in-person banking channel. For example, in receiving the first unstructured activity data associated with the first enterprise channel at step 204, user personalization computing platform 110 may receive unstructured activity data that is captured on a voice assistant channel, an interactive voice response (IVR) channel, an automated teller machine (ATM) channel, an online banking channel, a mobile banking channel, or an in-person banking channel. Such data may, for instance, be captured by one or more source systems that are linked to, support applications hosted on, and/or are otherwise associated with one or more of these channels.

Figure 2B:
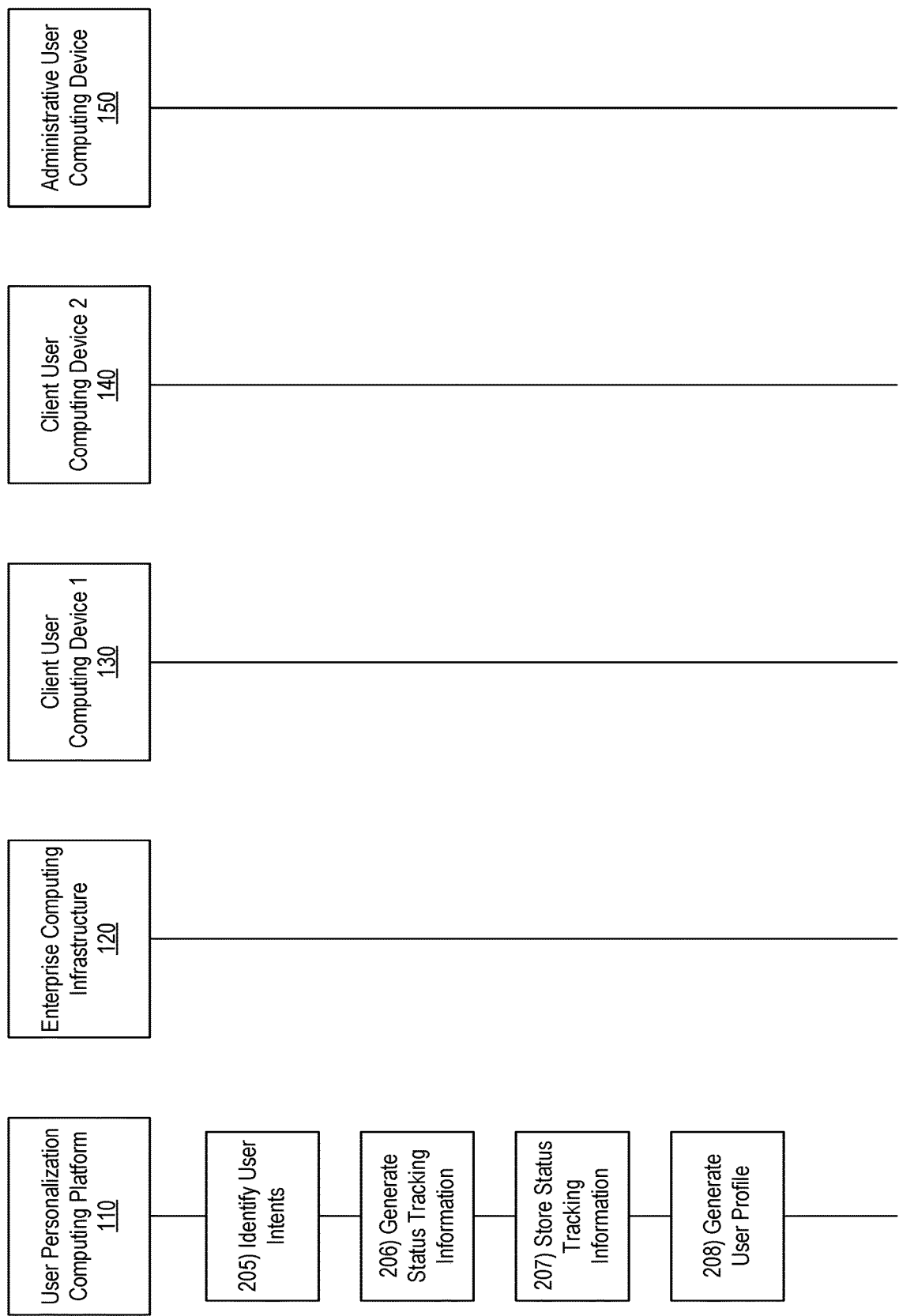

Referring to FIG. 2B, at step 205, user personalization computing platform 110 may identify one or more user intents. For example, at step 205, user personalization computing platform 110 may identify one or more user intents by applying an intent discovery model to the first unstructured activity data associated with the first enterprise channel. The intent discovery model may be and/or include a machine learning model that is trained to classify different and discrete activity events as corresponding to specific user intents. The model may be trained and/or otherwise created using artificial intelligence (AI) functions, machine learning (ML) functions, and/or application programming interfaces (APIs) available in one or more software development kits.

In some embodiments, identifying the one or more user intents by applying the intent discovery model to the first unstructured activity data associated with the first enterprise channel may include applying a machine learning model that is continuously applied to different intent data associated with different users that is received across different channels. For example, in identifying the one or more user intents by applying the intent discovery model to the first unstructured activity data associated with the first enterprise channel at step 205, user personalization computing platform 110 may apply a machine learning model that is continuously applied to different intent data associated with different users that is received across different channels. For instance, the machine learning model may be applied continuously and automatically tuned by user personalization computing platform 110.

In some embodiments, identifying the one or more user intents by applying the intent discovery model to the first unstructured activity data associated with the first enterprise channel may include applying a machine learning model that is trained on a baseline dataset that maps specific sequences of customer activity events to specific customer intents. For example, in identifying the one or more user intents by applying the intent discovery model to the first unstructured activity data associated with the first enterprise channel at step 205, user personalization computing platform 110 may apply a machine learning model that is trained on a baseline dataset that maps specific sequences of customer activity events to specific customer intents. The baseline dataset may, for instance, be manually curated by a user of administrative user computing device 150 and provided to user personalization computing platform 110 during a model training and/or configuration phase prior to user personalization computing platform 110 receiving activity data for intent analysis.

At step 206, user personalization computing platform 110 may generate status tracking information for the identified user intent(s). For example, at step 206, user personalization computing platform 110 may generate status tracking information based on identifying the one or more user intents.

In some embodiments, generating the status tracking information based on identifying the one or more user intents may include generating a status tracking data structure that includes one or more of an intent identifier, an intent type identifier, a completion status identifier, a progress status value, or a number of interactions value. For example, in generating the status tracking information based on identifying the one or more user intents at step 206, user personalization computing platform 110 may generate a status tracking data structure that includes one or more of an intent identifier, an intent type identifier, a completion status identifier, a progress status value, or a number of interactions value. Any and/or all of these identifiers and/or values may be derived by user personalization computing platform 110 from the unstructured activity data and/or produced by the machine learning model.

At step 207, user personalization computing platform 110 may store the status tracking information. For example, at step 207, user personalization computing platform 110 may store, in a consolidated event repository (which may, e.g., be maintained by and/or in user personalization database 112b), the status tracking information generated based on identifying the one or more user intents. In addition, storing the status tracking information in the consolidated event repository may cause the status tracking information to be exposed to multiple computer systems associated with different enterprise channels. For example, by storing the status tracking information in the consolidated event repository, user personalization computing platform 110 may cause the status tracking information to be exposed to multiple computer systems associated with different enterprise channels. Such computer systems may be part of and/or included in enterprise computing infrastructure 120 and may host and/or support various applications that provide functionality and/or services on such channels.

In some embodiments, storing the status tracking information in the consolidated event repository may include storing the status tracking information in a database that comprises one or more call to action templates. For example, in storing the status tracking information in the consolidated event repository at step 207, user personalization computing platform 110 may store the status tracking information in a database (e.g., user personalization database 112b) that comprises one or more call to action templates. The call to action templates may, for instance, define certain circumstances and/or conditions in which user personalization computing platform 110 may take automatic actions with respect to a given intent based on the occurrence of specific activity events and/or sequences of activity events.

At step 208, user personalization computing platform 110 may generate a user profile for client user computing device 130. For example, at step 208, after storing the status tracking information in the consolidated event repository, user personalization computing platform 110 may generate, based on the status tracking information, a user profile for a user device (e.g., client user computing device 130) linked to the first unstructured activity data associated with the first enterprise channel. The user profile may, for instance, include one or more device identifiers and/or user identifiers, as well as preconfigured information associated with one or more intents discovered and/or otherwise identified with respect to the user of the user device (e.g., client user computing device 130).

Referring to FIG. 2C, at step 209, user personalization computing platform 110 may push the user profile to client user computing device 130. For example, at step 209, user personalization computing platform 110 may push the user profile to the user device (e.g., client user computing device 130). In addition, pushing the user profile to the user device may cause the user device to install the profile. For instance, by pushing the user profile to the user device (e.g., client user computing device 130), user personalization computing platform 110 may cause the user device (e.g., client user computing device 130) to install the profile.

In some embodiments, pushing the user profile to the user device may cause a local application on the user device to present one or more offline reminder messages. For example, by pushing the user profile to the user device (e.g., client user computing device 130) at step 209, user personalization computing platform 110 may cause a local application on the user device (e.g., client user computing device 130) to present one or more offline reminder messages. Such offline reminder messages may, for instance, include personalized offer messages, insight messages, or proactive communication messages that may be generated by user personalization computing platform 110 based on the status tracking information stored in the consolidated event repository, but presented by client user computing device 130 unprompted by user personalization computing platform 110 (e.g., in an offline manner).

In some embodiments, pushing the user profile to the user device may cause a local application on the user device to optimize call routing for a user linked to the user device. For example, by pushing the user profile to the user device (e.g., client user computing device 130) at step 209, user personalization computing platform 110 may cause a local application on the user device (e.g., client user computing device 130) to optimize call routing for a user linked to the user device (e.g., client user computing device 130). For instance, if the user linked to client user computing device 130 attempts to contact, by telephone call or other voice call, an enterprise organization operating user personalization computing platform 110, the user profile installed on client user computing device 130 may be recognized by user personalization computing platform 110 and/or an IVR system included in enterprise computing infrastructure 120 so as to optimize internal call routing of the call from the user of client user computing device 130 (e.g., so as to provide the user of client user computing device 130 with faster and more convenient support as a known/verified user).

At step 210, client user computing device 130 may install the user profile. For example, at step 210, client user computing device 130 may save, apply, and/or otherwise install the user profile received from user personalization computing platform 110.

At step 211, user personalization computing platform 110 may detect a call to action. For example, at step 211, user personalization computing platform 110 may detect that a call to action condition is met based on the status tracking information stored in the consolidated event repository (which may, e.g., be maintained in user personalization database 112b).

At step 212, user personalization computing platform 110 may generate one or more alerts (e.g., based on the call to action). For example, at step 212, in response to detecting that the call to action condition is met based on the status tracking information stored in the consolidated event repository, user personalization computing platform 110 may generate one or more alerts for one or more user devices (e.g., client user computing device 130, administrative user computing device 150).

In some embodiments, detecting that the call to action condition is met based on the status tracking information stored in the consolidated event repository may include detecting that an additional customer interaction has occurred, and generating the one or more alerts for the one or more user devices may include generating one or more personalized offer messages, insight messages, or proactive communication messages based on the status tracking information stored in the consolidated event repository. For example, in detecting that the call to action condition is met based on the status tracking information stored in the consolidated event repository at step 212, user personalization computing platform 110 may detect that an additional customer interaction has occurred (e.g., based on additional activity data received from enterprise computing infrastructure 120). In addition, in generating the one or more alerts for the one or more user devices at step 212, user personalization computing platform 110 may generate one or more personalized offer messages, insight messages, or proactive communication messages based on the status tracking information stored in the consolidated event repository. In some instances, the additional interaction may be on the same channel or a different channel than the first channel associated with the original unstructured activity data. Such an additional interaction may, for instance, be an initiated but incomplete loan application, a large deposit transaction without further action, or the like. The personalized offer messages, insight messages, or proactive communication messages may be generated based on the call to action templates and/or the machine learning model to provide the user with specific advice and/or opportunities related to the additional interaction that occurred.

Figure 2D:
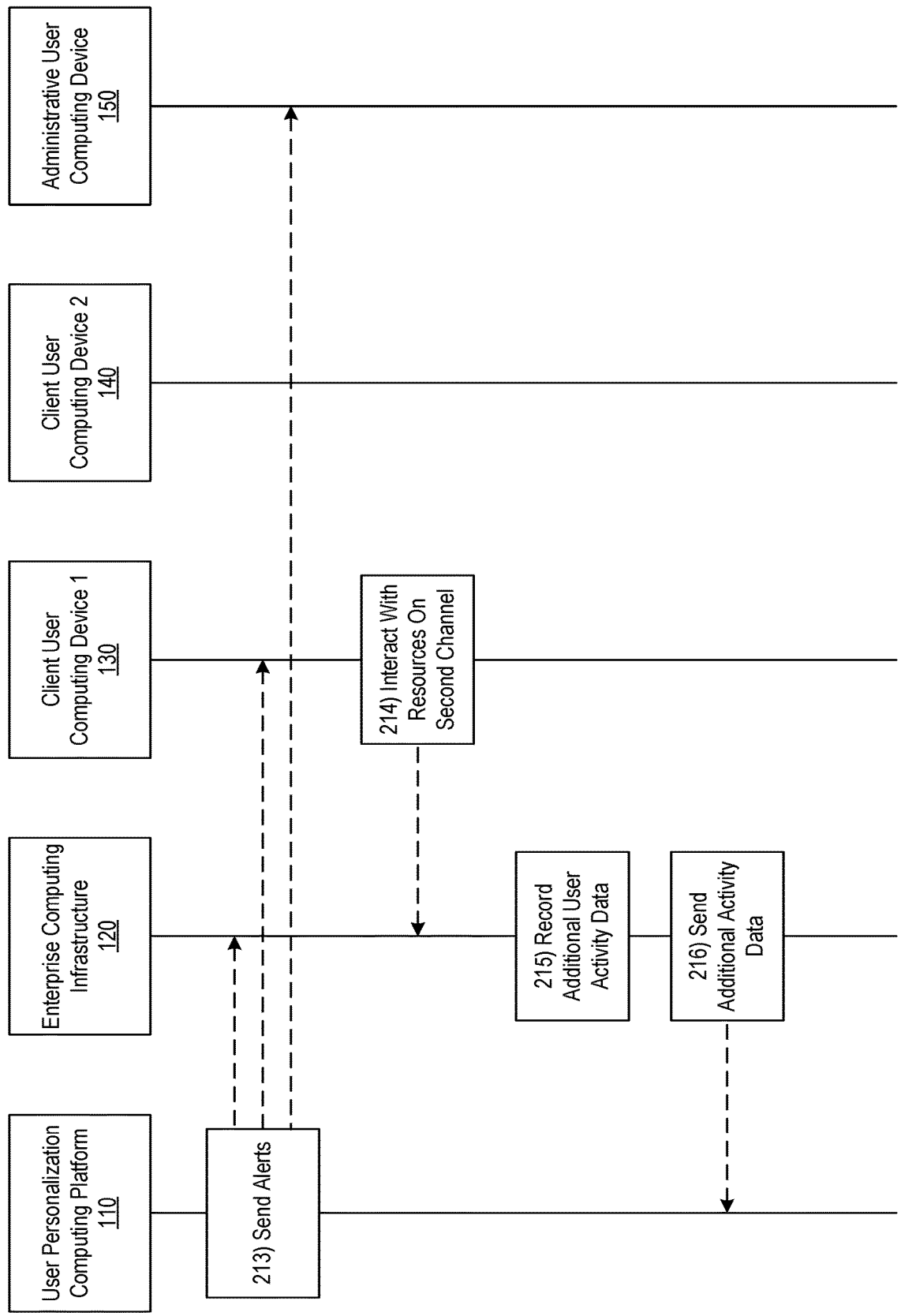
Figure 3:
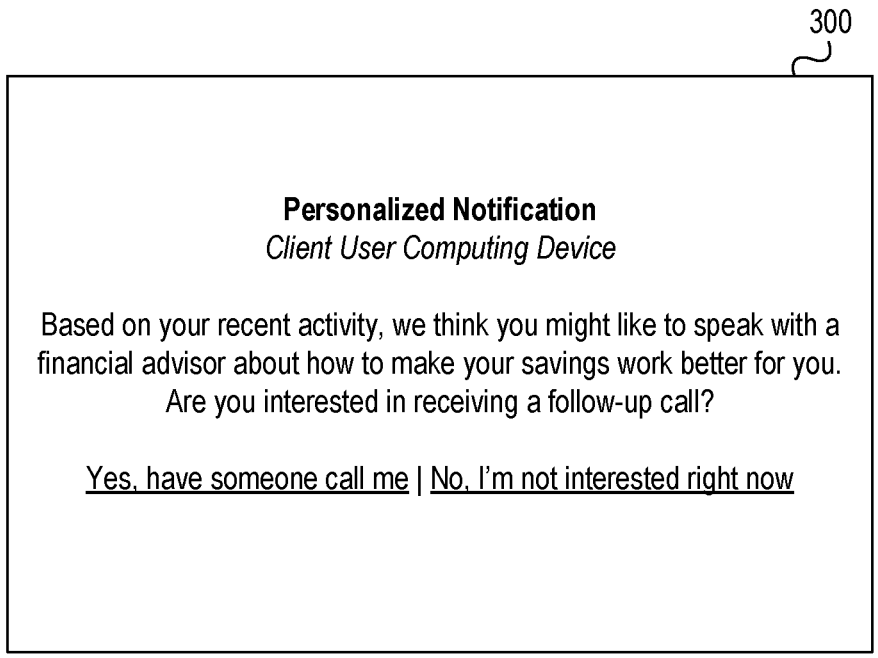
FIGS. 3 and 4 depict example graphical user interfaces for generating and providing enhanced user interfaces by implementing data, AI, intents and personalization (DAIP) technology in accordance with one or more example embodiments.

Referring to FIG. 2D, at step 213, user personalization computing platform 110 may send the one or more alerts generated for the one or more user devices (e.g., client user computing device 130, administrative user computing device 150). For example, at step 213, user personalization computing platform 110 may send, via the communication interface (e.g., communication interface 113), to the one or more user devices (e.g., client user computing device 130, administrative user computing device 150), the one or more alerts generated for one or more user devices (e.g., client user computing device 130, administrative user computing device 150). In some instances, sending the one or more alerts to the one or more user devices may cause the one or more user devices to display one or more graphical user interfaces based on the one or more alerts. For instance, by sending the one or more alerts to client user computing device 130, user personalization computing platform 110 may cause client user computing device 130 to display a graphical user interface similar to graphical user interface 300, which is illustrated in FIG. 3. As seen in FIG. 3, graphical user interface 300 may include text and/or other information notifying a user about a detected call to action and providing one or more user-selectable options associated with personalized offer messages, insight messages, or proactive communication messages for the user of client user computing device 130 (e.g., "Based on your recent activity, we think you might like to speak with a financial advisor about how to make your savings work better for you. Are you interested in receiving a follow-up call? Yes, have someone call me|No, I'm not interested right now").

At step 214, client user computing device 130 may interact with resources on a second channel. For example, client user computing device 130 may access, modify, and/or otherwise interact with one or more computing resources that are provided on a second enterprise channel (which may, e.g., be different from the first enterprise channel interacted with at step 201) and/or hosted by one or more computer systems that are connected to and/or part of enterprise computing infrastructure 120. For instance, client user computing device 130 may interact with a natural language application that includes a chat bot and is provided on a chat bot channel or a mobile banking application that is provided on a mobile banking channel.

At step 215, enterprise computing infrastructure 120 may record user activity data. For example, at step 215, enterprise computing infrastructure 120 may generate and/or store unstructured user activity data that specifies one or more characteristics of (and/or is otherwise associated with) the interactions of the user of client user computing device 130 with the resources of the second channel. At step 216, enterprise computing infrastructure 120 may send the user activity data to user personalization computing platform 110.

Referring to FIG. 2E, at step 217, user personalization computing platform 110 may receive additional activity data from enterprise computing infrastructure 120. For example, at step 217, user personalization computing platform 110 may receive, via the communication interface (e.g., communication interface 113), from the enterprise computing infrastructure (e.g., enterprise computing infrastructure 120), second unstructured activity data associated with a second enterprise channel different from the first enterprise channel. As in the examples discussed above, the unstructured activity data may, for instance, be one or more data files in various different formats, and might not be particularly adapted for a specific application on user personalization computing platform 110. Rather, the unstructured activity data might include raw event logs, activity logs, interaction data, or the like in a variety of different file formats that are native to the corresponding source system(s) that produced unstructured activity data.

At step 218, user personalization computing platform 110 may identify one or more updated user intents. For example, at step 218, user personalization computing platform 110 may identify one or more updated user intents by applying the intent discovery model to the second unstructured activity data associated with the second enterprise channel. As in the examples discussed above, the intent discovery model may be and/or include a machine learning model that is trained to classify different and discrete activity events as corresponding to specific user intents. The model may be trained and/or otherwise created using artificial intelligence (AI) functions, machine learning (ML) functions, and/or application programming interfaces (APIs) available in one or more software development kits.

At step 219, user personalization computing platform 110 may generate updated status tracking information for the identified user intent(s). For example, at step 219, user personalization computing platform 110 may generate updated status tracking information based on identifying the one or more updated user intents. Such updated status information may be generated by user personalization computing platform 110 similar to how the status information is generated at step 206.

At step 220, user personalization computing platform 110 may store updated status tracking information. For example, at step 220, user personalization computing platform 110 may store, in the consolidated event repository (which may, e.g., be maintained by and/or in user personalization database 112b), the updated status tracking information generated based on identifying the one or more updated user intents. In addition, storing the updated status tracking information in the consolidated event repository may cause the updated status tracking information to be exposed to the multiple computer systems associated with the different enterprise channels. For example, by storing the updated status tracking information in the consolidated event repository, user personalization computing platform 110 may cause the updated status tracking information to be exposed to the multiple computer systems associated with the different enterprise channels. Such computer systems may be part of and/or included in enterprise computing infrastructure 120 and may host and/or support various applications that provide functionality and/or services on such channels, as in the examples discussed above.

Figure 4:
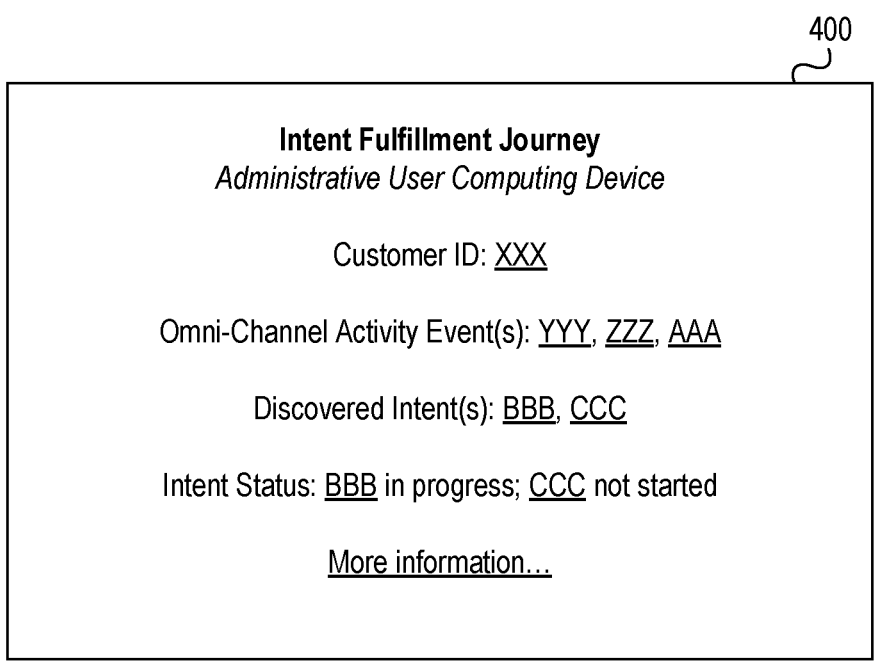

In some instances, by storing the updated status tracking information in the consolidated event repository, user personalization computing platform 110 may cause one or more graphical user interfaces to be presented by one or more user devices. For instance, by storing the updated status tracking information in the consolidated event repository, user personalization computing platform 110 may cause administrative user computing device 150 to display and/or otherwise present a graphical user interface similar to graphical user interface 400, which is illustrated in FIG. 4. As seen in FIG. 4, graphical user interface 400 may include text and/or other information identifying a given user's intent fulfillment journey and one or more user-selectable options that enable a user of administrative user computing device 150 to access and/or modify information associated with the given user's discovered intents (e.g., "Customer ID: XXX; Omni-Channel Activity Event(s): YYY, ZZZ, AAA; Discovered Intent(s): BBB, CCC; Intent Status: BBB in progress; CCC not started; More information . . . ").

Figure 5:
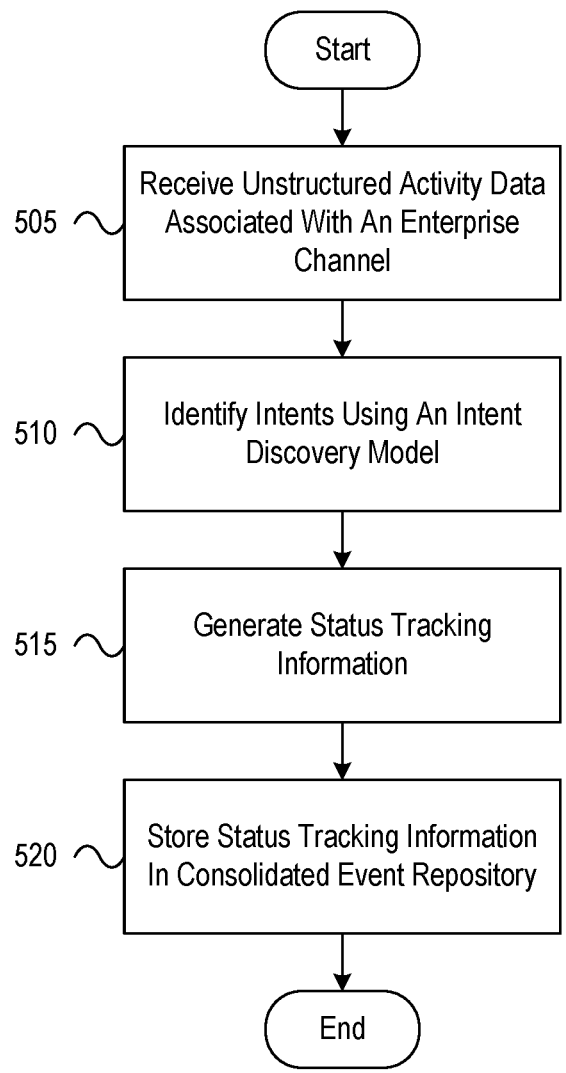
FIG. 5 depicts an illustrative method for generating and providing enhanced user interfaces by implementing data, AI, intents and personalization (DAIP) technology in accordance with one or more example embodiments.

FIG. 5 depicts an illustrative method for generating and providing enhanced user interfaces by implementing data, AI, intents and personalization (DAIP) technology in accordance with one or more example embodiments. Referring to FIG. 5, at step 505, a computing platform having at least one processor, a communication interface, and memory may receive, via the communication interface, from enterprise computing infrastructure, first unstructured activity data associated with a first enterprise channel. At step 510, the computing platform may identify one or more user intents by applying an intent discovery model to the first unstructured activity data associated with the first enterprise channel. At step 515, the computing platform may generate status tracking information based on identifying the one or more user intents. At step 520, the computing platform may store, in a consolidated event repository, the status tracking information generated based on identifying the one or more user intents, where storing the status tracking information in the consolidated event repository causes the status tracking information to be exposed to multiple computer systems associated with different enterprise channels.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, from enterprise computing infrastructure associated with an enterprise organization, first unstructured activity data associated with a first enterprise communication channel of the enterprise organization;
   identify one or more user intents by applying an intent discovery model to the first unstructured activity data associated with the first enterprise communication channel;
   generate status tracking information based on identifying the one or more user intents; and
   store, in a consolidated event repository, the status tracking information generated based on identifying the one or more user intents, wherein storing the status tracking information in the consolidated event repository causes the status tracking information to be exposed to multiple computer systems associated with different enterprise communication channels of the enterprise organization.

2. The computing platform of claim 1, wherein receiving the first unstructured activity data associated with the first enterprise communication channel comprises receiving one or more of a client identifier associated with a first activity event, a user name associated with the first activity event, a timestamp associated with the first activity event, a channel identifier associated with the first activity event, one or more keywords associated with the first activity event, or a problem type identifier associated with the first activity event.

3. The computing platform of claim 1, wherein receiving the first unstructured activity data associated with the first enterprise communication channel comprises receiving unstructured activity data that is captured by a source system without a native intent mapping functionality.

4. The computing platform of claim 1, wherein receiving the first unstructured activity data associated with the first enterprise communication channel comprises receiving unstructured activity data that is captured on a voice assistant channel, an interactive voice response (IVR) channel, an automated teller machine (ATM) channel, an online banking channel, a mobile banking channel, or an in-person banking channel.

5. The computing platform of claim 1, wherein identifying the one or more user intents by applying the intent discovery model to the first unstructured activity data associated with the first enterprise communication channel comprises applying a machine learning model that is continuously applied to different intent data associated with different users that is received across different channels.

6. The computing platform of claim 1, wherein identifying the one or more user intents by applying the intent discovery model to the first unstructured activity data associated with the first enterprise communication channel comprises applying a machine learning model that is trained on a baseline dataset that maps specific sequences of customer activity events to specific customer intents.

7. The computing platform of claim 1, wherein generating the status tracking information based on identifying the one or more user intents comprises generating a status tracking data structure that includes one or more of an intent identifier, an intent type identifier, a completion status identifier, a progress status value, or a number of interactions value.

8. The computing platform of claim 1, wherein storing the status tracking information in the consolidated event repository comprises storing the status tracking information in a database that comprises one or more call to action templates.

9. The computing platform of claim 1, wherein the memory stores additional computer-readable instructions that, when executed by the at least one processor, cause the computing platform to:

after storing the status tracking information in the consolidated event repository:
  generate, based on the status tracking information, a user profile for a user device linked to the first unstructured activity data associated with the first enterprise communication channel; and
  push the user profile to the user device, wherein pushing the user profile to the user device causes the user device to install the user profile.

10. The computing platform of claim 9, wherein pushing the user profile to the user device causes a local application on the user device to present one or more offline reminder messages.

11. The computing platform of claim 9, wherein pushing the user profile to the user device causes a local application on the user device to optimize routing of calls to the enterprise organization for a user linked to the user device.

12. The computing platform of claim 1, wherein the memory stores additional computer-readable instructions that, when executed by the at least one processor, cause the computing platform to:
  detect that a call to action condition is met based on the status tracking information stored in the consolidated event repository;
  in response to detecting that the call to action condition is met based on the status tracking information stored in the consolidated event repository, generate one or more alerts for one or more user devices; and
  send, via the communication interface, to the one or more user devices, the one or more alerts generated for one or more user devices.

13. The computing platform of claim 12, wherein detecting that the call to action condition is met based on the status tracking information stored in the consolidated event repository comprises detecting that an additional customer interaction has occurred, and wherein generating the one or more alerts for the one or more user devices comprises generating one or more personalized offer messages, insight messages, or proactive communication messages based on the status tracking information stored in the consolidated event repository.

14. The computing platform of claim 1, wherein the memory stores additional computer-readable instructions that, when executed by the at least one processor, cause the computing platform to:
  receive, via the communication interface, from the enterprise computing infrastructure associated with the enterprise organization, second unstructured activity data associated with a second enterprise communication channel of the enterprise organization different from the first enterprise communication channel of the enterprise organization;
  identify one or more updated user intents by applying the intent discovery model to the second unstructured activity data associated with the second enterprise communication channel;
  generate updated status tracking information based on identifying the one or more updated user intents; and
  store, in the consolidated event repository, the updated status tracking information generated based on identifying the one or more updated user intents, wherein storing the updated status tracking information in the consolidated event repository causes the updated status tracking information to be exposed to the multiple computer systems associated with the different enterprise communication channels of the enterprise organization.

15. A method, comprising:
at a computing platform comprising at least one processor, a communication interface, and memory:
  receiving, by the at least one processor, via the communication interface, from enterprise computing infrastructure associated with an enterprise organization, first unstructured activity data associated with a first enterprise communication channel of the enterprise organization;
  identifying, by the at least one processor, one or more user intents by applying an intent discovery model to the first unstructured activity data associated with the first enterprise communication channel;
  generating, by the at least one processor, status tracking information based on identifying the one or more user intents; and
  storing, by the at least one processor, in a consolidated event repository, the status tracking information generated based on identifying the one or more user intents, wherein storing the status tracking information in the consolidated event repository causes the status tracking information to be exposed to multiple computer systems associated with different enterprise communication channels of the enterprise organization.

16. The method of claim 15, wherein receiving the first unstructured activity data associated with the first enterprise communication channel comprises receiving one or more of a client identifier associated with a first activity event, a user name associated with the first activity event, a timestamp associated with the first activity event, a channel identifier associated with the first activity event, one or more keywords associated with the first activity event, or a problem type identifier associated with the first activity event.

17. The method of claim 15, wherein receiving the first unstructured activity data associated with the first enterprise communication channel comprises receiving unstructured activity data that is captured by a source system without a native intent mapping functionality.

18. The method of claim 15, wherein receiving the first unstructured activity data associated with the first enterprise communication channel comprises receiving unstructured activity data that is captured on a voice assistant channel, an interactive voice response (IVR) channel, an automated teller machine (ATM) channel, an online banking channel, a mobile banking channel, or an in-person banking channel.

19. The method of claim 15, wherein identifying the one or more user intents by applying the intent discovery model to the first unstructured activity data associated with the first enterprise communication channel comprises applying a machine learning model that is continuously applied to different intent data associated with different users that is received across different channels.

20. One or more non-transitory computer-readable media storing instructions that, when executed by a computing platform comprising at least one processor, a communication interface, and memory, cause the computing platform to:
  receive, via the communication interface, from enterprise computing infrastructure associated with an enterprise organization, first unstructured activity data associated with a first enterprise communication channel of the enterprise organization;
  identify one or more user intents by applying an intent discovery model to the first unstructured activity data associated with the first enterprise communication channel;

generate status tracking information based on identifying the one or more user intents; and store, in a consolidated event repository, the status tracking information generated based on identifying the one or more user intents, wherein storing the status tracking information in the consolidated event repository causes the status tracking information to be exposed to multiple computer systems associated with different enterprise communication channels of the enterprise organization.

* * * * *